(12) United States Patent
Zimmermann

(10) Patent No.: US 11,738,872 B2
(45) Date of Patent: Aug. 29, 2023

(54) AIRCRAFT PASSENGER SEAT, AND SEAT ROW

(71) Applicant: ZIM AIRCRAFT SEATING GMBH, Immenstaad am Bodensee (DE)

(72) Inventor: Peter Zimmermann, Ueberlingen (DE)

(73) Assignee: ZIM Aircraft Seating GmbH, Immenstaad am Bodensee (DE)

( * ) Notice: Subject to any disclaimer, the term of this patent is extended or adjusted under 35 U.S.C. 154(b) by 0 days.

(21) Appl. No.: 17/820,896

(22) Filed: Aug. 19, 2022

(65) Prior Publication Data

US 2022/0402617 A1 Dec. 22, 2022

Related U.S. Application Data

(63) Continuation of application No. PCT/EP2021/055380, filed on Mar. 3, 2021.

(30) Foreign Application Priority Data

Mar. 5, 2020 (DE) ...................... 10 2020 106 037.8

(51) Int. Cl.
*B64D 11/06* (2006.01)
(52) U.S. Cl.
CPC ........ *B64D 11/0696* (2013.01); *B64D 11/062* (2014.12); *B64D 11/0606* (2014.12)
(58) Field of Classification Search
CPC .............. B64D 11/0696; B64D 11/062; B64D 11/0648; B64D 11/0649
USPC ..................................................... 244/122 R
See application file for complete search history.

(56) References Cited

U.S. PATENT DOCUMENTS

| 2,933,127 | A | * | 4/1960 | Brewster | .............. | B64D 11/064 |
| | | | | | | 297/216.2 |
| 4,768,830 | A | | 9/1988 | Musselwhite | | |
| 5,390,982 | A | | 2/1995 | Johnson et al. | | |
| 5,636,901 | A | * | 6/1997 | Grilliot | .................... | B60N 2/68 |
| | | | | | | 248/188.1 |
| 10,661,904 | B1 | * | 5/2020 | Oleson | .............. | B64D 11/0621 |
| 2008/0231092 | A1 | | 9/2008 | Silva | | |
| 2013/0049415 | A1 | | 2/2013 | Reinck | | |
| 2016/0083095 | A1 | | 3/2016 | Joffre et al. | | |
| 2017/0283079 | A1 | | 10/2017 | Meadows et al. | | |
| 2018/0281960 | A1 | * | 10/2018 | Weingart | .............. | B64D 11/062 |
| 2018/0339776 | A1 | | 11/2018 | Hainsworth et al. | | |

(Continued)

FOREIGN PATENT DOCUMENTS

| CN | 113602504 A | * | 11/2021 |
| DE | 10 2005 022 949 A1 | | 11/2006 |

(Continued)

OTHER PUBLICATIONS

German Search Report (Application No. 10 2020 106 037.8) dated Mar. 3, 2021.

(Continued)

*Primary Examiner* — Christopher P Ellis
(74) *Attorney, Agent, or Firm* — Burr Patent Law, PLLC

(57) ABSTRACT

A passenger seat having a frame is proposed, wherein the frame is intended for securing to a floor of a passenger cabin, wherein the frame comprises a seat divider and beams that run transverse to the seat direction, wherein the seat divider is held by the beams, wherein a housing is disposed on the seat divider, wherein the housing at least partly surrounds a backrest. According to the invention, a structure component is disposed on the seat divider, with an attachment unit for a safety belt for a passenger disposed on the structure component.

13 Claims, 3 Drawing Sheets

(56) References Cited

U.S. PATENT DOCUMENTS

2019/0002106 A1      1/2019   Stachel et al.
2022/0348331 A1*   11/2022   Jensen ............... B64D 11/0636

FOREIGN PATENT DOCUMENTS

| DE | 10 2005 022 950 A1 | | 11/2006 | |
|---|---|---|---|---|
| DE | 10 2017 124 349 A1 | | 4/2019 | |
| DE | 102017124349 A1 | * | 4/2019 | ............. B60N 2/242 |
| DE | 102020106035 A1 | * | 9/2021 | ......... B64D 11/0636 |
| DE | 102020106039 A1 | * | 9/2021 | ......... B64D 11/0606 |
| EP | 1 724 194 A1 | | 11/2006 | |
| EP | 2 565 073 A1 | | 3/2013 | |
| GB | 2035790 A | * | 6/1980 | ............. B60N 2/242 |
| GB | 2476385 A | * | 6/2011 | ............... B60N 2/34 |
| GB | 2582654 A | * | 9/2020 | ......... B64D 11/0636 |
| WO | 2017/108537 A1 | | 6/2017 | |
| WO | WO-2017108537 A1 | * | 6/2017 | ............. A47C 7/563 |
| WO | WO-2021175939 A1 | * | 9/2021 | ......... B64D 11/0636 |
| WO | WO-2021175990 A1 | * | 9/2021 | ............. B60N 3/004 |
| WO | WO-2022039788 A1 | * | 2/2022 | |

OTHER PUBLICATIONS

International Search Report and Written Opinion (Application No. PCT/EP2021/055380) dated Jun. 24, 2021 (with English translation).

International Preliminary Report on Patentability (Application No. PCT/EP2021/055380) (with Ch. II Claims) dated May 18, 2022 (with English translation).

\* cited by examiner

AIRCRAFT PASSENGER SEAT, AND SEAT ROW

CROSS REFERENCE TO RELATED APPLICATIONS

This application is a continuation of International Application No. PCT/EP2021/055380 filed Mar. 3, 2021, which designated the United States, and claims the benefit under 35 USC § 119(a)-(d) of German Application No. 10 2020 106 037.8 filed Mar. 5, 2020, the entireties of which are incorporated herein by reference.

FIELD OF THE INVENTION

The present invention relates to a passenger seat having a structure component and to a row of seats formed, for example, from two such passenger seats.

BACKGROUND OF THE INVENTION

Passenger aircraft are equipped with passenger seats and rows of seats having multiple passenger seats arranged alongside one another. The passenger seats may have a multitude of embodiments.

All passenger seats must meet safety guidelines. At the same time, the seats should be of minimum weight. Also desirable is a compact outer shape.

The passenger seat must be constructed such that it meets the demands as demonstrated by tests stipulated by safety guidelines, especially crash tests. For this purpose, stable bonds are needed between various components of the passenger seat.

For example, there is a safety belt on the passenger seat. The safety belt is preferably designed as a lap belt and is connected, for example, to a frame and/or a seat divider of the passenger seat using, for example, two belt attachment points.

SUMMARY OF THE INVENTION

It is an object of the present invention to provide a passenger seat improved with regard to elevated stability.

All directions hereinafter are stated in relation to a seat direction, the seat direction being understood to mean the direction of view of a passenger having sat upon the passenger seat.

The invention proceeds from a passenger seat having a frame intended for securing to a floor of a passenger cabin, wherein the frame comprises a seat divider and beams that run transverse to the seat direction, wherein the seat divider is held by the beams, wherein a housing is disposed on the seat divider, wherein the housing at least partly surrounds a backrest.

The passenger seat preferably comprises, as well as the frame and the housing, a headrest, a cushion for a backrest, a seat base and a legrest. These four essential parts of the passenger seat, for example, are preferably connected to one another, for example via joints or other mechanisms, and are advantageously adjustable, especially displaceable relative to one another.

"Bottom" refers to the floor of the passenger cabin, while "top" refers to an opposite position which is especially spaced apart vertically with respect to the bottom.

Preferably, the seat divider and the beams are made of a metal material, for example a lightweight material, advantageously of aluminum, or of another lightweight and stable material, and/or, for example, of a composite material, especially of a carbon fiber composite material. Advantageously, all components of the passenger seat are optimized with regard to their materials and the associated weight. More particularly, a shape and/or an outline of the components is also optimized with regard to weight, such that the components have, for example, material recesses that likewise contribute to a weight saving.

The passenger seat can be arranged via the frame on the floor of a passenger cabin. The frame comprises the seat divider and the beams that run transverse to the seat direction, with provision of a first beam at the front and a second beam arranged behind it, viewed in seat direction. Preferably, both beams are arranged on the seat divider. Advantageously, the two beams run spaced apart from one another, especially mainly parallel to one another.

The seat divider is designed as a mechanically stable component of the passenger seat. More particularly, the seat divider is designed to absorb forces that act on the passenger seat in the event of a crash and/or to direct them in the direction of the floor of the passenger cabin and/or to transfer them into the floor.

Viewed in seat direction, the seat divider has a height, a width and a depth. The width of the seat divider, for example in the single-digit centimeter range, is preferably less than the depth of the seat divider. For example, the height of the seat divider is found from a dimension in vertical direction in relation to the passenger seat. Preferably, the height of the seat divider is a multiple of the width and/or depth of the seat divider.

The housing can be arranged on the seat divider. The housing at least partly surrounds the backrest of the passenger seat. In a preferred embodiment, the passenger seat encompasses the housing that can be arranged in the region of the backrest. For example, the backrest is displaceable, especially movable, relative to the housing in the region of the housing. It is preferable that the housing is fixed, for example in a fixed position, and is especially not movable in the adjustment of the backrest. In an advantageous execution variant, the housing can be disposed on the seat divider.

There are preferably two seat dividers per passenger seat. For example, the two seat dividers are arranged on the passenger seat spaced apart from one another in width direction, especially on the right- and left-hand side, in relation to seat direction. The two seat dividers are preferably arranged parallel to one another. Advantageously, two planes each formed from the top and base of the respective seat divider are in at least an approximately parallel arrangement. More particularly, the passenger seat is bounded by the seat dividers on either side, advantageously in the region of the seat base. Preferably, the seat divider is designed to be mechanically stressable such that, for example, the belt attachment points for the safety belt for the passenger can be disposed on the seat divider, for example by screw attachment. At the bottom, the seat divider can be connected to the floor of the cabin by a support foot structure.

The core of the invention is that there is a structure component disposed on the seat divider, with an attachment unit for a safety belt for a passenger disposed on the structure component.

The structure component is disposed on the seat divider. The structure component extends above the seat divider up to an upper end of the passenger seat; in particular, the structure component covers a height of the backrest. For example, the structure component can be disposed on the seat divider by means of a connection device. For example, the seat divider and the structure component are connected in a mechanically stable and releasable manner by means of the connection device, for example fitted together and screwed and/or riveted. An attachment unit for a safety belt for the passenger is disposed on the structure component.

Preferably, the attachment unit is fixed to the structure component, preferably by riveting and/or screw connection and/or welding and/or soldering and/or adhesive bonding. The attachment unit is fixable to the structure component in a releasable or unreleasable manner.

For example, the structure component is formed from a lightweight and mechanically stable material, for example from metal, especially aluminum, and/or a composite material, especially a carbon fiber composite material.

Preferably, the structure component is designed in such a way that it can absorb and/or transmit forces that are introduced into the safety belt, for example, and transmitted to the attachment unit in the event of an application of load, especially in the event of a crash.

For example, the housing covers the structure component which, for example, is disposed within the housing.

For example, the structure component is in one-piece form, for example in the shape of a shell, especially in the form of a shell within the housing. Another possibility is a multipart configuration of the structure component.

In an advantageous embodiment, two attachment units for the safety belt are disposed on the housing.

For example, a first and a second attachment unit for the safety belt are disposed on the housing. Preferably, the second attachment unit is mounted in a mechanically stable manner on the housing, for example by screw or rivet connection. Advantageously, the first attachment unit is disposed on the structure component. In a preferred embodiment, the attachment unit is designed as a deflection element and/or a securing element for a belt strap of the safety belt.

In a preferred execution variant, multiple structure components form a structure assembly, wherein the structure assembly comprises at least one horizontal and two vertical structure components. A passenger seat preferably comprises multiple structure components that form a structure assembly. The alignment of the structure components is based on the alignment of the passenger seat as utilized by a passenger, i.e. in an installed state.

The structure components are, for example, in plate form and/or in two-dimensional form, with each structure component having a length, width and height. In particular, the structure components have a long side and a short side and a thickness. For example, the long side and the short side are each several times the thickness of the structure component. Advantageously, the long side and the short side form a plane.

The vertical structure component is arranged in such a way that its main direction, with the long side, is aligned in vertical direction based on the seat direction. The horizontal structure component is arranged in such a way that its main direction, with the long side, is aligned in horizontal direction based on the seat direction.

Preferably, the two vertical structure components are arranged spaced apart from one another, especially opposite and spaced apart from one another in horizontal direction. Preferably, the planes, formed from long and short sides opposite one another, are especially in virtually parallel alignment.

For example, the horizontal structure component is disposed between the two vertical structure components, preferably angled with respect to the two vertical structure components. In a preferred embodiment, the resultant arrangement of the structure components is in the form of a ladder. More particularly, the horizontal structure component is arranged at an angle, especially at a right angle, to the two vertical structure components. Advantageously, the structure components are each bonded to one another, for example by means of a bracket and screws and/or rivets.

It is preferable that the vertical structure components are connected to the seat dividers of the passenger seat by means of the connection device.

Preferably, the vertical structure components and the horizontal structure component are manufactured from aluminum, especially a corrugated aluminum sheet, especially a sandwich corrugated aluminum sheet.

For example, the attachment unit is disposed on the horizontal structure component.

Advantageously, the first attachment unit is disposed on the horizontal structure component.

In a preferred embodiment, a crossbeam is disposed between two vertical structure components, with the crossbeam in the form of a u-shaped profile.

Preferably, the crossbeam is disposed between the vertical structure components in addition to a horizontal structure component. This results in an advantageous configuration of the crossbeam with an angular cross section, especially with a rectangular and/or square, preferably u-shaped, cross section with an open side of the crossbeam. Advantageously, the crossbeam is manufactured from a mechanically stable material, especially metal, e.g. steel and/or aluminum and/or a composite material, especially a carbon fiber composite material.

For example, a bushing, e.g. an opening, is present on one of the vertical structure components, into which the crossbeam can be fitted.

In an advantageous embodiment, the crossbeam adjoins the second vertical structure component on a narrow side of the structure component.

Preferably, the crossbeam and the vertical structure components are in a form-fitting arrangement, and are especially connected to one another in a form-fitting manner.

Advantageously, the crossbeam is bonded, especially fixed, to the vertical structure component, for example via a bracket and screws and/or rivets.

In a further advantageous configuration, the crossbeam is contacted on at least one side by an attachment element. For example, the attachment element takes the form of an attachment sheet. The attachment element is preferably formed, especially formed and especially bent in such a way as to accommodate the crossbeam. It is preferable that the attachment element is disposed above and/or beneath the crossbeam on the vertical structure components, especially riveted on and/or screwed on. The crossbeam and the attachment element are preferably disposed in a form-fitting manner, especially connected to one another in a form-fitting manner.

It is further preferable that the attachment unit for the safety belt is disposed on the attachment element. Preferably, the second attachment unit for the safety belt is disposed on the attachment element, especially by securing and/or fixing, for example screwed on and/or riveted on.

Preferably, the attachment element consists of a deformable material, for example metal, wherein the attachment element can absorb energy in the event of a crash. In an advantageous configuration, the attachment element consists of a reshapable, especially deformable, material. In an advantageous configuration, the attachment element is designed to absorb energy from the load case in particular as, for example, deformation energy via a selected and controlled deformation of a section of the attachment element.

It is preferable that the attachment element is configured such that it absorbs the energy that acts in the load case and/or in the event of a crash on the safety belt and hence via the attachment unit on the attachment element, and/or is able to transmit it to the crossbeam and/or the structure components. The absorption of energy in the load case and/or in the event of a crash leads to a deformation and/or reshaping, especially in a defined manner, of the attachment element.

Preferably, the attachment unit disposed on the attachment element takes the form of a belt deflector. For example, the belt deflector is designed as a loop-shaped and/or ring-shaped, preferably oval, especially closed, element. Preferably, the belt deflector is designed in such a way that the safety belt is guided through the ring-shaped element. In a preferred embodiment, the belt deflector serves to change the direction of the safety belt, especially in a further direction, at an angle to the vertical direction, for example over a shoulder of the passenger. For example, the attachment unit is fixed on the attachment element, especially by means of a screw and/or a rivet.

Advantageously, the attachment unit disposed on the horizontal structure component takes the form of a belt roller. For example, the belt roller is designed to take up the safety belt, especially to store safety belt not being used by the passenger. Advantageously, the belt roller is equipped with a winding mechanism, the winding mechanism being designed to guide and especially to tension and/or wind up the safety belt. It is preferable that the belt roller is designed to automatically wind up the safety belt when the safety belt is not being used, especially when one end of the safety belt is not fixed in a belt lock.

Preferably, the safety belt is an additional safety belt. For example, the safety belt is present in addition to a lap belt. The lap belt is secured, for example, on the two belt attachments on the seat divider.

In an advantageous embodiment, the additional safety belt is provided for guiding over the upper body of a passenger; in particular, the additional safety belt is designed to attenuate the impact of the passenger's head in the event of a crash, especially with a further passenger seat, or row of seats, disposed in front of the passenger. Advantageously, the additional safety belt should be used by the passenger only in particular periods of the flight, especially during taxiing, takeoff and landing of the aircraft. Preferably, the additional safety belt is fixed with the belt lock, especially closed. The safety belt is a multipoint safety belt, especially when used together with the lap belt. The advantageous configuration gives a passenger a similar feel to that of a 3-point belt in a motor vehicle, especially car.

It is preferable that a row of seats comprises at least two passenger seats according to any of the above-detailed configuration forms. Preferably, the row of seats consists of two passenger seats, in which case the two passenger seats have a common frame for securing to the cabin floor. For example, the beams are disposed on the support foot structure, on which in turn are disposed the seat dividers. The two passenger seats, for example, comprise common beams. In a preferred execution variant, two seat dividers are disposed on the beams for each passenger seat. Preferably, the structure components are disposed on the seat dividers via the connection device. Preferably, receptacles for the additional safety belt are disposed on the structure component and on the attachment element.

BRIEF DESCRIPTION OF THE DRAWINGS

Further advantageous features, configurations, variants and embodiments are elucidated in detail by a schematic working example.

DETAILED DESCRIPTION OF THE INVENTION

Figure 3:
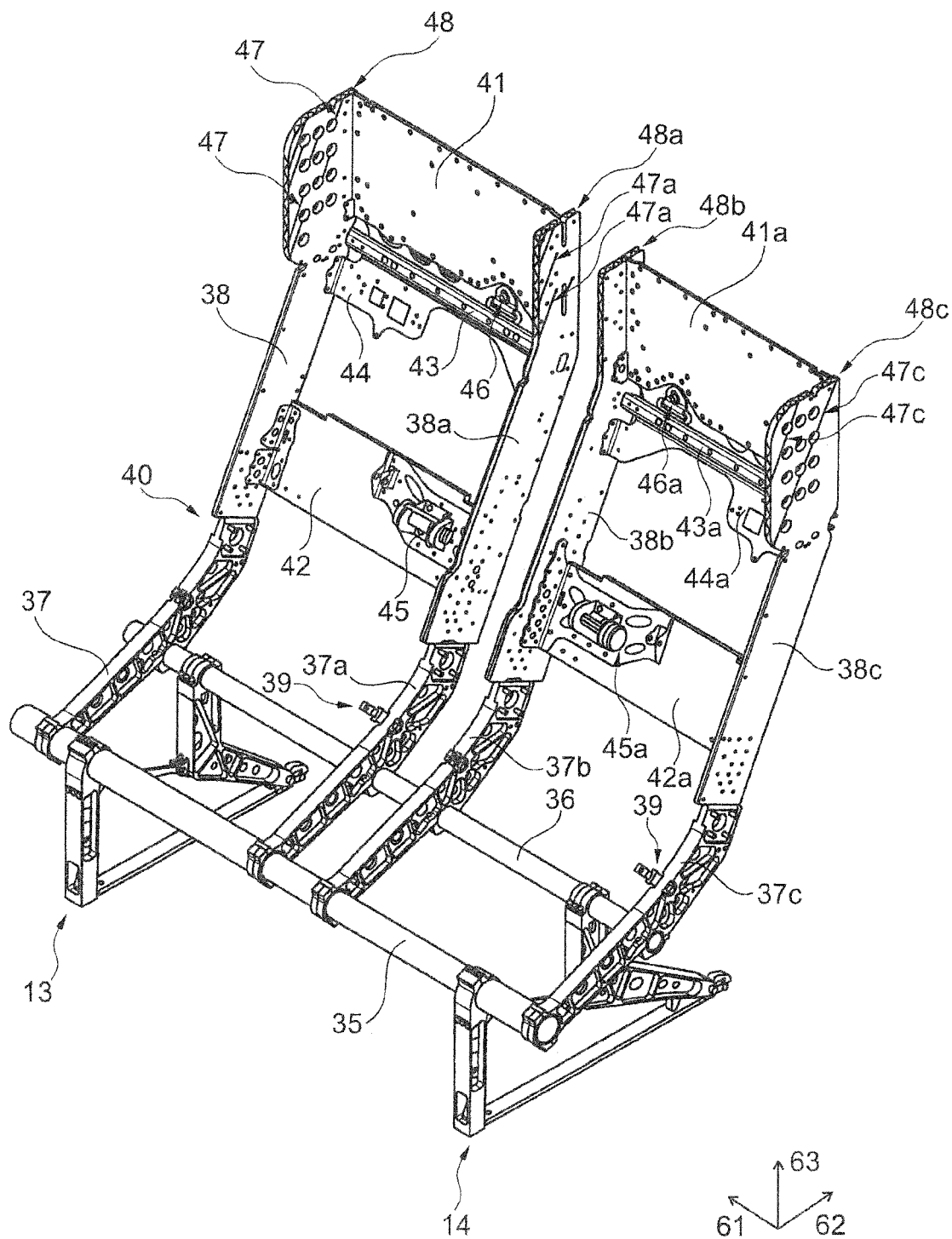
FIG. 3 shows a basic construction of the row of seats 1 from FIG. 1 in a perspective view obliquely from the front.

A utilizable, functioning passenger seat requires further components that are not shown in FIGS. 3 to 5. The only components addressed are those needed for the connection device.

Figure 1:
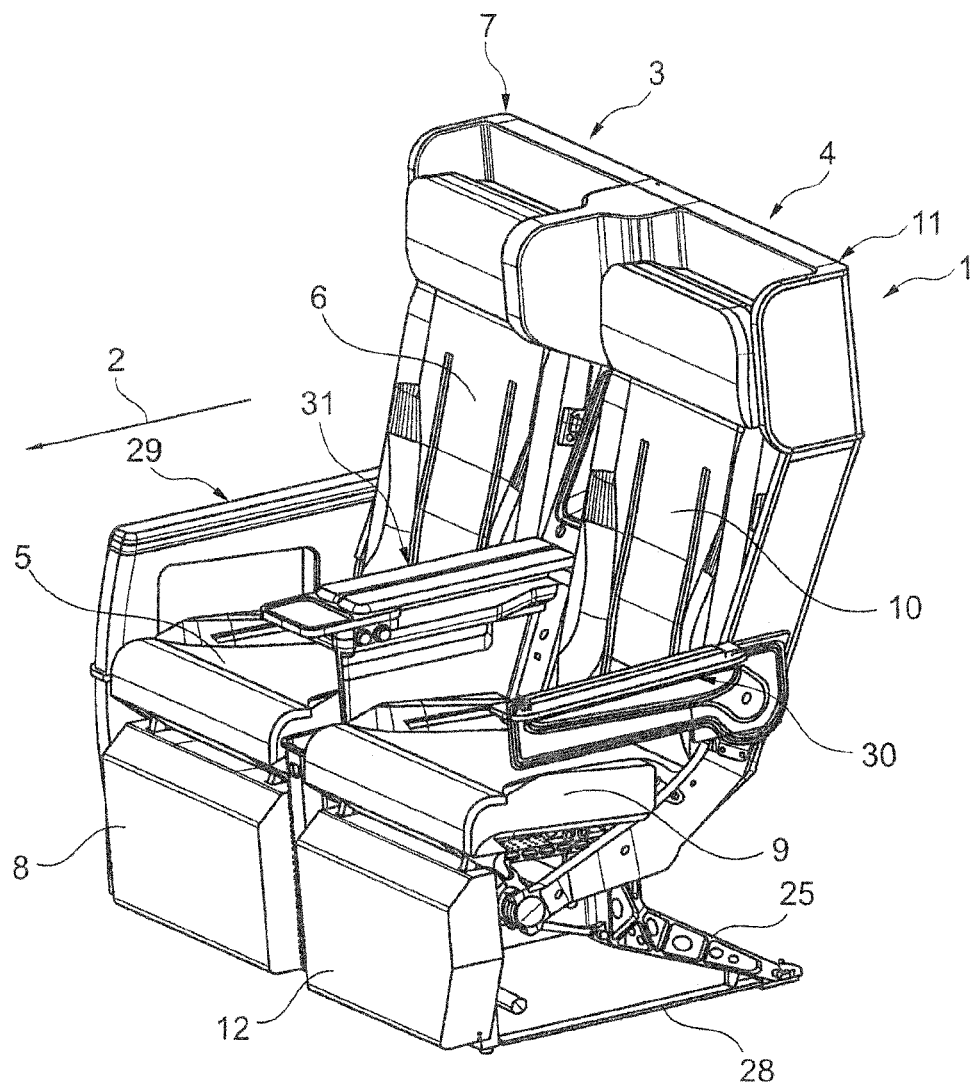
FIG. 1 shows a perspective view obliquely from the front of a row of seats with two passenger seats each comprising a seat base, a backrest together with housing on the reverse side, and a legrest.

FIG. 1 shows a row of seats 1 with a seat direction 2 with two passenger seats 3 and 4. Statements of position and direction hereinafter, such as front, back, top and bottom, relate to the seat direction 2 and the installed state of the row of seats 1.

The two passenger seats 3 and 4 are of corresponding construction. Passenger seat 3 has a seat base 5, a backrest 6 and a housing 7 on the reverse side of the backrest 6. Connected to an end region at the front of the seat base 5 is a legrest 8 that can preferably be folded away, which can be folded away about a horizontal axis.

Accordingly, the passenger seat 4 comprises a seat base 9, a backrest 10, a housing 11 and a legrest 12.

The seat bases 5, 9, the backrests 6, 10 and the legrests 8, 12 comprise preferably ergonomically shaped cushioning.

The passenger seats 3 and 4 can be mounted via two support legs 13 and 14 on a cabin floor of a flight cabin of a corresponding aircraft.

For this purpose, the support leg 13, in a lower end region 16 of a front strut 15, has a mount point 17, and a further mount point 20 in a lower region 19 of a rear strut 18. Between the end regions 16 and 19, a bracing element 21 is provided.

The support leg 14, in a lower end region 23 of a front strut 22, has a mount point 24, and a further mount point 27 at a lower end region 26 of a rear strut 25. Between the end regions 23 and 26, a bracing element 28 is provided.

The row of seats 1 additionally has an outer armrest 29 at the side of the passenger seat 3, and an outer armrest 30 at the side of the passenger seat 4. Between the two passenger seats 3 and 4, there is preferably a console 31 at the level of the two outer armrests 29 and 30, which can likewise be utilized as armrest by one passenger.

Disposed within the shell form of the respective housing 7 or 11 is the respective backrest 6 or 10. The backrest 6 or 10 is preferably movable within the housing 7 or 11 for adjustment of the different tilt positions, for example, together with the corresponding displaceable seat base 5 or 9.

The housings 7 and 11 are provided with further elements, for example, each with additional functions on the reverse side. For example, a multimedia unit 32 for digital media is provided in each case in an upper region on the reverse side of the housings 7, 11, for example, with an electronic input and output device or with a touchscreen.

Figure 2:
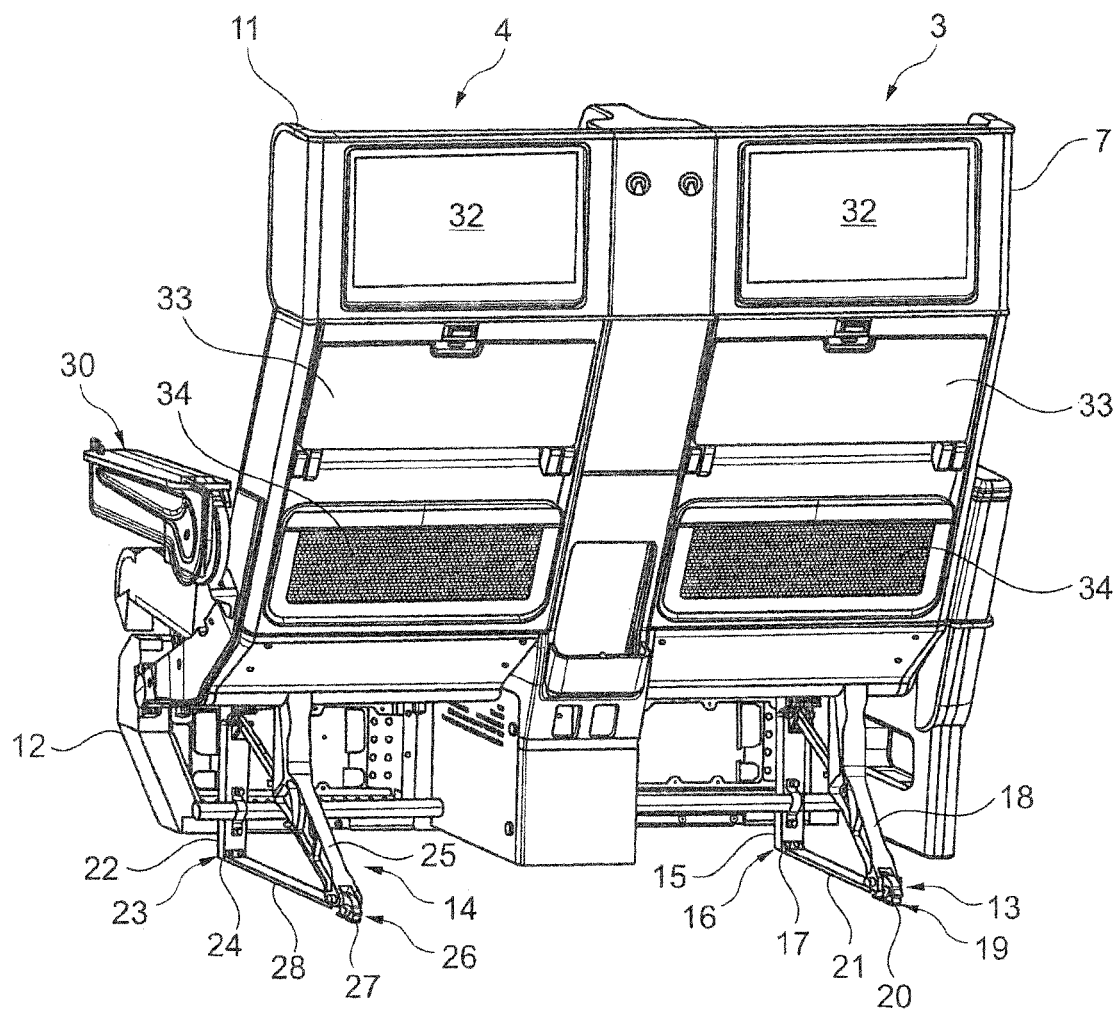
FIG. 2 shows a row of seats according to FIG. 1 in a perspective view obliquely from the back.

In a middle region, or one that adjoins the multimedia unit 32 at the bottom, for example, a foldaway tray element 33 such as a tablet table with a table panel is formed in each case. FIG. 2 shows the tray element 33 in a vertical and secured non-utilized position folded away in the upward direction.

Below the respective foldaway tray element 33, there is a storage shelf 34, for example, for accommodation of magazines or brochures or other articles.

FIG. 3 shows, in a perspective view, a basic construction of the row of seats 1 comprising the passenger seats 3, 4 according to FIGS. 1 and 2. The basic construction comprises, for example, a frame, structure components 38, 38a, 38b, 38c and seat dividers 37, 37a, 37b, 37c. For example, two beams 35, 36 are disposed on a frame comprising the support legs 13, 14. Advantageously, the front beam 35 and the rear beam 36 are aligned approximately parallel to one another. Preferably, a seat divider 37 is disposed on the beams 35 and 36. It is preferable that there are two seat dividers 37, 37a for the passenger seat 3 and the further seat dividers 37b, 37c for the passenger seat 4. In particular, the seat dividers 37 to 37c have different material recesses. The seat dividers 37, 37a, 37b, 37c are preferably of the same construction, especially identical construction. The seat divider 37 is especially designed as a flat, angled, for example, arc-shaped, component. For example, a connection device 40 (not shown in full) is disposed at the upper end of the seat divider 37.

In an advantageous embodiment, a belt attachment 39 for the passenger's safety belt is disposed on each seat divider 37, 37a, 37b, 37c; in particular, all four belt attachments 39 in the arrangement are of identical design. For example, the belt attachment 39 is screwed onto the seat dividers 37 to 37c; advantageously, a safety belt, especially with a belt lock and/or a hook and/or eye matched to the belt lock, is mounted on the belt attachment 39.

Advantageously, the structure components 38, 38a, 38b, 38c are in two-dimensional form and/or in plate form; in particular, they have a width, a depth and a height. In the working example shown, the width is in the region of a few centimeters. The depth of the structure components is several times the width. The height of a particular structure component 38-38c is likewise several time the width; in particular, the height is greater than the depth. All directions are based on the three spatial directions of width 61, depth 62 and height 63, as shown in FIG. 3. Advantageously, the depth 62 is aligned parallel to seat direction 2.

Preferably, the structure components 38, 38a, 38b, 38c are manufactured from aluminum, for example, in a sandwich construction, especially from a corrugated aluminum sheet, and especially cut out. In a preferred execution variant, the corrugated aluminum sheets have a connecting structure (48, 48a, 48b, 48c) in the interior, in the form of a corrugated structure especially comprising wave peaks and/or wave troughs, which each have, for example, a crest line (47, 47a, 47c). Advantageously, the long side of the structure components 38 to 38c is aligned parallel to the crest line of the wave peaks and/or troughs. An outer surface of the corrugated aluminum sheet is in two-dimensional form, especially in the form of a cover sheet that conceals the internal structure of the corrugated aluminum sheet.

In the embodiment shown, the structure component 38 or 38c is disposed on the left- or right-hand outer face of the row of seats composed of two passenger seats. The two structure components 38 and 38c are preferably of the same shape; in particular, the structure components 38 and 38c, in their respective upper end region, based on height direction 63, have a broadening compared to the extent, viewed in depth direction 62, in the middle and lower region.

The structure components 38a and 38b, in the execution variant shown, are disposed in the middle of the row of seats composed of passenger seats 3 and 4. For example, the structure component 38a is the right-hand boundary of the passenger seat 3, and the structure component 38b is the left-hand boundary of the passenger seat 4. The two structure components 38a and 38b are preferably of the same design; in particular, they have the same shape. Preferably, the structure component 38 or 38b, in its lower end region, in height direction 63, is in a broadened configuration, especially with respect to a middle and/or upper region of the structure component 38a or 38b.

In the embodiment shown, for example, a connecting structure component 41 is disposed on two structure components 38 and 38a. Preferably, the connecting structure component 41 is mounted at the upper end of the vertically aligned structural components 38, 38a.

A connecting structure component 41a is disposed between the vertically aligned structure components 38b and 38c. Preferably, the connecting structure component 41 or 41a has a stiffening and/or mechanically stabilizing effect together with the two vertical structure components 38 and 38a, or 38b and 38c. For example, the connecting structure component 41 and the structure components 38, 38a are connected to one another by connecting means, e.g. brackets and/or screws and/or rivets. Likewise possible is connection of connecting structure component and structure component by means, for example, of soldering, welding and/or adhesive bonding, especially in a material-cohesive manner.

The structure component 38a or 38b preferably has incisions and/or recesses. The connecting structure component 41 or 41a is designed to be disposed within, especially fitted into, these recesses.

Alternatively, a one-piece design of the structure components 38 and 38a with the connecting structure component 41 is possible. The same applies to the connecting component 41a.

Preferably, the connecting structure component 41 or 41a takes the form of an element in plate form with, for example, an approximately rectangular shape, with a long side and a short side and a thickness. Preferably, the connecting structure components 41 and 41a are manufactured from a metal sheet, especially a corrugated aluminum sheet and/or a composite material. For example, the connecting structure component is aligned such that the long side of the connecting structure component 41 or 41a is arranged in horizontal direction based on the passenger seat. The long side of the connecting structure component 41 or 41a is aligned in the direction of the width 61.

In the embodiment shown in FIG. 3, the connecting structure component 41 concludes with the seat divider 38 at a rear end based on seat direction 2. Based on seat direction 2, the connecting structure component 41 is offset somewhat in the backward direction relative to the structure component 38a. The recesses or incisions into which the connecting structure component 41 is fitted in the structure component 38a are especially disposed between a middle and a rear end of the structure component 38a, viewed in seat direction 2.

In the base construction of the passenger seat 4, in FIG. 3, the connecting structure component 41a is fitted into the structure component 38b, especially by the same principle in which the connecting structure component 41 is connected to the structure component 38a. The connecting structure component 41a in the execution variant shown concludes with the structure component 38c in a rear region, especially at the back end of the structure component 38a, viewed in seat direction 2 or depth direction 62.

Advantageously, the connecting structure components 41 and 41a are connected to the respective structure components 38, 38a, 38b, 38c via connecting means, especially brackets and/or screws and/or rivets.

In the embodiment shown in FIG. 3, a further horizontal structure component 42 is disposed between the structure components 38 and 38*a* of the base construction of the passenger seat 3. The horizontal structure component 42 is disposed between the structure components 38 and 38*a* at the lower end thereof. Preferably, the horizontal structure component 42 is in the region of the lower back of a passenger seated on the passenger seat 3. The horizontal structure component 42 is advantageously made from aluminum, especially a corrugated aluminum sheet. Preferably, a corrugation structure in the corrugated aluminum sheet is arranged such that a crest line (47, 47*a*, 47*c*) of a wave peak and/or a wave trough is aligned parallel to a long side of the horizontal structure component 42. The long side of the horizontal structure component 42 is advantageously aligned in the direction of the width 61, especially parallel.

For example, in the base construction of the passenger seat 4, a horizontal structure component 42*a* is likewise disposed between the seat dividers 38*b* and 38*c*. The horizontal structure component 42*a* is especially of the same or identical design as the horizontal structure component 42.

In the structure component 42 or 42*a*, an attachment unit for a safety belt is provided in each case; in particular, the attachment unit is designed as a belt roller 45 or 45*a*.

For example, the belt roller 45 is disposed on the horizontal structure component 42, especially by screw and/or rivet attachment. Preferably, the belt roller 45 is disposed on the horizontal structure component 42, viewed in width direction, closer to the structure component 38*a* than to the structure component 38. Preferably, the belt roller 45 is disposed on an assembly element, for example, an assembly sheet, especially connected to the horizontal structure component 42 by means of the assembly element.

It is preferable that the belt roller 45*a* is disposed on the horizontal structure component 42*a*, especially attached by screw and/or rivet connection. Preferably, the belt roller 45*a* is disposed on the horizontal structure component 42*a*, viewed in width direction, closer to the structure component 38*b* than to the structure component 38*c*.

Below the connecting structure component 41 or 41*a* is disposed an attachment element 44 or 44*a*, especially in the form of an attachment sheet.

Advantageously, a crossbeam 43 or 43*a* is likewise provided beneath in height direction 63. The crossbeam 43 is preferably designed as a u-shaped profile. For example, the crossbeam 43 is especially designed as a crossbar made of aluminum and/or steel.

The attachment element 44 is preferably designed as a deformable, for example, plastically deformable, attachment sheet that can absorb energy by a deformation, especially a defined plastic deformation, in a load case. Advantageously, the attachment element 44 is connected to the two structure components 38 and 38*a* of the passenger seat 3; in particular, the attachment element 44 is mounted by connection means, e.g. screws and/or rivets, on the structure component 38 and 38*a*.

It is preferable that the attachment element 44 encloses the crossbeam 43 on one side of the u shape. In particular, the attachment element 44 concludes the u shape of the crossbeam 43 to form a hollow body. For example, an open reverse side of the crossbeam 43 is bridged by the attachment element 44.

In the embodiment shown in FIG. 3, the crossbeam 43 is open on a rear side viewed in depth direction 62.

The crossbeam 43 is preferably fitted into a recess in the structure component 38*a*, especially inserted in a form-fitting manner. In the structure component 38, the crossbeam 43 preferably adjoins the rear side viewed in depth direction 62; in particular, the rear narrow face of the structure component 38 has an indentation, especially for the crossbeam 43.

Preferably, the attachment element 44 is curved, especially u-shaped. For example, the attachment element 44 is designed as a bent sheet-metal part. Preferably, the crossbeam 43 is disposed in the bulge of the attachment element 44. The result is advantageously a hollow shape which is composed of crossbeam 43 and a covering section of the attachment element 44 and which is closed over the essential width of the passenger seat.

It is preferable that a connection unit for the passenger's safety belt disposed is disposed on the attachment element 44, especially in the form of a belt deflector 46. The belt deflector 46 is disposed on the attachment element 44. The belt deflector 46 preferably comprises a securing site and an eye-shaped deflecting element, in particular, which is configured such that the safety belt is guided through the eye-shaped deflecting element and, at the same time, forces that act on the belt deflector 46 via the safety belt can be guided, especially dissipated.

Preferably, the securing site of the belt deflector 46 is disposed, especially bonded, on the attachment element 44 by means of a screw and/or a rivet.

In the advantageous embodiment shown, the attachment element 44 and the securing site of the belt deflector 46 are designed to absorb energy and/or to dissipate it via deformation, especially a controlled deformation, e.g. plastic deformation, of the securing site of the belt deflector 46 and/or the attachment element 44.

The belt deflector 46 is preferably arranged closer to the structure component 38*a* in width direction 61.

The same applies to the belt deflector 46*a* mounted on the attachment element 44*a*.

The passenger's safety belt, which is not shown in FIG. 3, runs from the belt roller 45 upward, in height direction 63, to the belt deflector 45 and then downward, for example, over the passenger's shoulder and the passenger's upper body. This safety belt is present as a safety belt in addition to the lap belt. The additional safety belt can be fixed to the lap belt which is closable via a belt lock, especially in the belt lock for the lap belt.

LIST OF REFERENCE NUMERALS

1 row of seats
2 seat direction
3 passenger seat
4 passenger seat
5 seat base
6 backrest
7 housing
8 legrest
9 seat base
10 backrest
11 housing
12 legrest
13 support leg
14 support leg
15 strut
16 end region
17 mount point
18 strut
19 end region
20 mount point
21 bracing element 22 strut
23 end region
24 mount point
25 strut
26 end region
27 mount point
28 bracing element
29 armrest
30 armrest
31 console
32 multimedia unit
33 tray element
34 storage shelf
35 front beam
36 rear beam
37 seat divider
37a seat divider
37b seat divider
37c seat divider
38 structure component
38a structure component
38b structure component
38c structure component
39 belt attachment
40 connecting device
41 connecting structure component
41a connecting structure component
42 horizontal structure component
42a horizontal structure component
43 crossbeam
43a crossbeam
44 attachment element
44a attachment element
45 belt roller
45a belt roller
46 belt deflector
46a belt deflector
47 line
47a line
47c line
48 connecting structure
48a connecting structure
48b connecting structure
48c connecting structure
49-60 not used
61 width
62 depth
63 height

The invention claimed is:

1. A passenger seat having a frame intended for securing to a floor of a passenger cabin, wherein the frame comprises a seat divider and beams that run transverse to the seat direction, wherein the seat divider is held by the beams, wherein a housing is disposed on the seat divider, wherein the housing at least partly surrounds a backrest of the passenger seat, wherein the backrest is movable relative to the housing in the region of the housing, with the housing being fixed when the backrest is moved, wherein a structure component is disposed on the seat divider, with an attachment unit for a safety belt for a passenger disposed on the structure component.

2. The passenger seat as claimed in claim 1, wherein two attachment units for the safety belt are disposed on the housing.

3. The passenger seat as claimed in claim 1, wherein multiple structure components form a structure assembly, wherein the structure assembly comprises at least one horizontal and two vertical structure components.

4. The passenger seat as claimed in claim 3, wherein the attachment unit is disposed on the horizontal structure component.

5. The passenger seat as claimed in claim 1, wherein a crossbeam is disposed between two vertical structure components, with the crossbeam in the form of a u-shaped profile.

6. The passenger seat as claimed in claim 5, wherein the crossbeam is contacted on at least one side by an attachment element.

7. The passenger seat as claimed in claim 6, wherein a second attachment unit for the safety belt is disposed on the attachment element.

8. The passenger seat as claimed in claim 6, wherein the attachment element consists of a deformable material, so that the attachment element can absorb energy in the event of a crash.

9. The passenger seat as claimed in claim 7, wherein the attachment unit disposed on the attachment element takes the form of a belt deflector.

10. The passenger seat as claimed in claim 4, wherein the attachment unit disposed on the horizontal structure component takes the form of a belt roller.

11. The passenger seat as claimed in claim 1, wherein the safety belt is an additional safety belt.

12. A row of seats comprising at least two passenger seats as claimed in claim 1.

13. The passenger seat as claimed in claim 8, wherein the deformable material is metal.

* * * * *